Patented Apr. 17, 1945

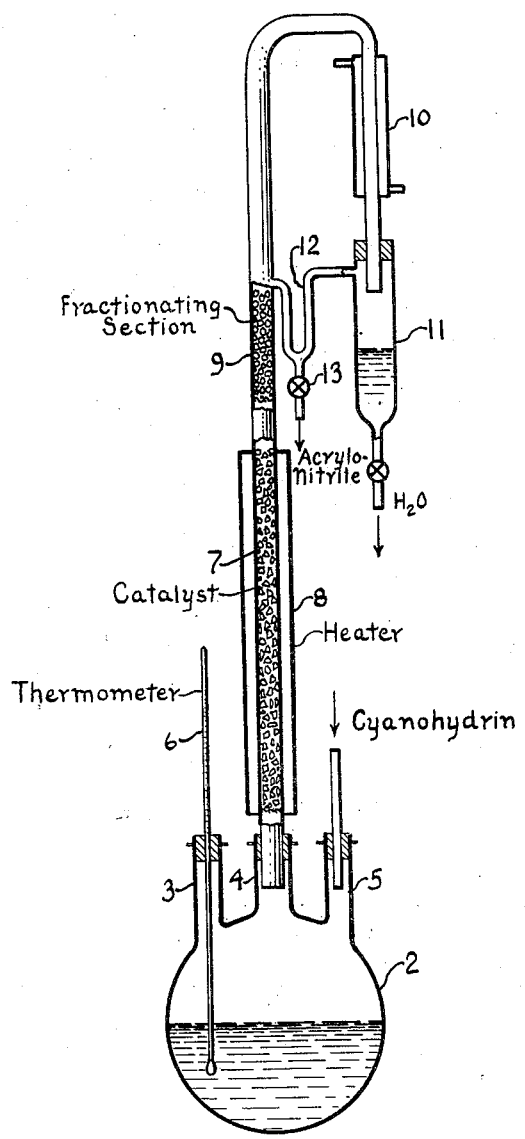

2,374,052

UNITED STATES PATENT OFFICE 2,374,052

PROCESS FOR PRODUCING ACRYLONITRILE

Le Roy U. Spence, Elkins Park, and John C. Mitchell, Philadelphia, Pa., assignors to Röhm & Haas Company, Philadelphia, Pa.

Application November 18, 1939, Serial No. 305,112

5 Claims. (Cl. 260—464)

This invention relates to a method for catalytically dehydrating ethylene cyanohydrin to form acrylonitrile.

It is known that ethylene cyanohydrin can be converted to acrylonitrile by means of strong dehydrating agents such as phosphorus pentoxide and also catalytically by means of dehydrating catalysts such as aluminum oxide and activated charcoals. In the catalytic processes heretofore proposed a considerable amount of a high boiling resinous mass is formed which deposits on the catalysts and renders it inactive after a comparatively short period of use. This trouble is encountered in processes in which the vapors of the ethylene cyanohydrin are passed over the heated catalyst as well as in those in which the catlyst is mixed directly with the ethylene cyanohydrin.

It is an object of this invention to provide a method for catalytically converting ethylene cyanohydrin to acrylonitrile whereby the deactivating effect of any high boiling resinous material is practically eliminated. It is a further object to provide a method which can be carried out continuously.

These objects are accomplished by passing the vapors of ethylene cyanohydrin upward through a column packed with the catalyst. Any ethylene cyanohydrin which passes through this column is condensed and allowed to flow back through the column. In this way the refluxed ethylene cyanohydrin washes the catalyst as it passes down the column and removes any of the resinous material which might have formed from the reaction. By operating in this manner a given quantity of catalyst can convert 100 to 150 times its own weight of ethylene cyanohydrin to the acrylonitrile before it is necessary to replace it. Even then the necessity for replacing the catalyst is due not to the deposition of the resinous material but to the mechanical disintegration of the particles of catalyst. Hence the catalyst can be removed from the tube, screened to eliminate the fines and the coarse particles replaced in the tube. It is then just as active as initially and the removal of the fines is in no sense a revivification of the catalyst. If the same catalyst is employed in the dehydration of ethylene cyanohydrin by methods which do not provide for the refluxing of the unconverted cyanohydrin, the catalyst is able to convert only 8 or 10 times its own weight of the cyanohydrin to acrylonitrile before it is rendered inactive due to the deposition of the resinous material.

Various catalysts may be used such as activated alumina, silica gel, phosphoric acid supported on pumice or activated alumina, activated charcoal, tin, etc. The preferred catalyst is activated alumina.

The yields vary somewhat with the purity of the ethylene cyanohydrin. Small amounts of ammonium salts which may be present from the hydrolysis of the cyanohydrin reduce the yields considerably. With ordinary, technically pure ethylene cyanohydrin yields of 70–80% of theory can be obtained, whereas by redistilling the cyanohydrin yields of 80–90% are obtained. A small amount of water in the cyanohydrin does not affect the yields.

The rate at which the vapors of the ethylene cyanohydrin are passed upward through the catalyst or the rate at which the acrylonitrile is produced does not seem to have any very great effect on the yields.

The process is generally carried out at atmospheric pressure so that when the ethylene cyanohydrin is distilled through the catalyst the temperature within the catalyst mass is about that of the boiling point of the ethylene cyanohydrin. Higher or lower pressures may be used if desired but there is no particular advantage to be gained by so doing.

The process may be carried out in an apparatus such as is represented diagrammatically in the accompanying drawing. The apparatus shown is arranged for intermittent operation but can be easily arranged to operate continuously. It consists of a flask or boiler 2 having three necks 3, 4, and 5. Neck 3 is arranged to carry a thermometer 6; neck 4 is connected with the refluxing catalyst tube 7 and neck 5 is arranged to feed the ethylene cyanohydrin into the flask 2 from any desired source. The catalyst tube is surrounded by a heating jacket 8 which is heated so as to maintain a fairly uniform temperature within the catalyst. The catalyst tube is extended above the heating zone and this portion is filled with glass beads or other inert packing material 9 which acts as a reflux condenser where any of the ethylene cyanohydrin which passes through the catalyst condenses and flows back to the catalyst mass. This extension of the catalyst tube is connected with a reflux condenser 10 which returns the condensate to the water separator 11. This separator is connected with the extension of the catalyst tube through the trap 12 so that part of the acrylonitrile can be returned to the fractionating part of the tube 7 to act as reflux. An outlet 13 is provided for the removal of the final product from the system.

This apparatus is operated as follows:
The ethylene cyanohydrin is placed in the flask 2 and heated to boiling, about 220° C. The vapors pass upward through the catalyst which is heated thereby and also by the heater 8. Here it is converted to acrylonitrile and water, the vapors of which pass through the fractionating portion of the column where any unchanged ethylene cyanohydrin is condensed. The vapors of the acrylonitrile and water pass then to the condenser 10 where they are condensed and led to the water separator 11. Part of the acrylonitrile is returned to the fractionating column through the trap 12 to scrub out any ethylene cyanohydrin and the remainder is removed through the outlet 13. The ethylene cyanohydrin which condenses in the fractionating section of the column flows back down over the catalyst and that which is not dehydrated flows down over the catalyst and ultimately reaches the flask 2. In flowing down over the catalyst the ethylene cyanohydrin washes off any of the resinous material which may have formed on the catalyst and returns it to the flask. In this manner the catalyst is always kept clean and thus its activity is unimpaired throughout long periods of use. The fractionating section may be replaced if desired by a partial condenser operating at 80–100° C. or the entire tube may be filled with catalyst. In the latter case the upper portion of the catalyst would be cooled by the reflux and thus act as a fractionating section.

The tables given below show the results of several runs made according to this invention. The catalyst tube was 0.56" inside diameter, the catalyst section about 15" long, and the fractionating section 5.5" long filled with glass helices. The temperature of the ethylene cyanohydrin in the flask was 220° C. at the start and remained about that until most of the ethylene cyanohydrin had been used up when it was gradually raised to about 275° C. to remove the remaining unchanged ethylene cyanohydrin. The temperature at the top of the catalyst section was about 200° C. and above the fractionating section 70–80° C. Part of the ethylene cyanohydrin was placed in the flask and the remainder added continuously throughout each individual run.

*Table I*

| Ethylene cyanohydrin | | | Catalyst | Yield, per cent | Time, hours | G. acrylonitrile per hour |
| --- | --- | --- | --- | --- | --- | --- |
| Weight | Purity | Grade | | | | |
| | Per cent | | | | | |
| 225 | 97 | Pure | Tin | 75.6 | 1.7 | 83 |
| 250 | 97 | do | Active Al$_2$O$_3$ | 82.5 | 2.7 | 55 |
| 250 | 97 | do | do | 80.3 | 3.0 | 50 |
| 250 | 98 | Tech | Pumice | 64.7 | 2.6 | 46 |
| 250 | 98 | do | Alundum | 59.4 | 2.7 | 41 |
| 250 | 98 | do | Silica Gel | 58.0 | 1.8 | 60 |
| 250 | 98 | do | H$_3$PO$_4$ on act. Al$_2$O$_3$ | 65.9 | 2.3 | 53 |

Table II shows the results of four successive runs through the same mass of catalyst.

*Table II*

| Ethylene cyanohydrin | | | Catalyst | Yield, per cent | Time, hours | G. acrylonitrile per hour |
| --- | --- | --- | --- | --- | --- | --- |
| Weight | Purity | Grade | | | | |
| | Per cent | | | | | |
| 250 | 97 | Pure | Active Al$_2$O$_3$ | 77.3 | 4.4 | 32 |
| 250 | 97 | do | do | 82.8 | 1.9 | 82 |
| 250 | 97 | do | do | 82.5 | 1.6 | 96 |
| 250 | 97 | do | do | 78.0 | 1.4 | 104 |

These results show that the activity of the catalyst actually increased throughout these four runs as may be seen by the relation between the yields and the rate of production of acrylonitrile given in the last column. In large scale operation a single charge of catalyst was used continuously for 120 hours at the end of which time its activity had not changed.

Table III shows the effect of purifying the ethylene cyanohydrin so as to remove all ammonium salts.

*Table III*

| Ethylene cyanohydrin | | | Catalyst | Yield, per cent | Time, hours | G. acrylonitrile per hour |
| --- | --- | --- | --- | --- | --- | --- |
| Weight | Purity | Grade | | | | |
| | Per cent | | | | | |
| 250 | 98 | C. P. | Active Al$_2$O$_3$ | 85.5 | 2.5 | 64 |
| 250 | 98 | C. P. | do | 84.0 | 4.0 | 39 |
| 250 | 98.9 | C. P. | do | 89.5 | 3.0 | 56 |

The acrylonitrile obtained by the method hereindescribed is practically pure but can be further purified by redistillation to remove small amounts of water or higher boiling material which may be present.

We claim:

1. In the process of producing acrylonitrile by the catalytic dehydration of ethylene cyanohydrin, the improvement which comprises vaporizing the ethylene cyanohydrin and passing it at about its boiling point upwards through a vertical column of a dehydrating catalyst, condensing any unchanged ethylene cyanohydrin in a fractionating zone, and flowing the condensate downwards over the catalyst.

2. In the process of producing acrylonitrile by the catalytic dehydration of ethylene cyanohydrin, the improvement which comprises vaporizing the ethylene cyanohydrin and passing it at about its boiling point upwards through a vertical column of a dehydrating catalyst, condensing any unchanged ethylene cyanohydrin at a temperature above the boiling point of acryonitrile in a zone above the catalyst and flowing the condensate downwards over the catalyst.

3. In the process of producing acryonitrile by the catalytic dehydration of ethylene cyanohydrin, the improvement which comprises vaporizing the ethylene cyanohydrin and passing it at about its boiling point upwards through a vertical column of a dehydrating catalyst, condensing any unchanged ethylene cyanohydrin at a temperature above the boiling point of acrylonitrile in a zone above the catalyst, flowing the condensate downwards over the catalyst, passing the vapors of the acrylonitrile and water formed by the reaction to a condenser, separating the condensed acrylonitrile from the water and returning part of it to the top of the fractionating zone.

4. In the process of producing acrylonitrile by the catalytic dehydration of ethylene cyanohydrin, the improvement which comprises vaporizing the ethylene cyanohydrin and passing it at about its boiling point upwards through a vertical column of a dehydrating catalyst consisting of activated alumina, condensing any unchanged ethylene cyanohydrin in a fractionating zone above the catalyst and flowing the condensate downwards over the catalyst.

5. In the process of producing acrylonitrile by the catalytic dehydration of ethylene cyanohydrin, the improvement which comprises vaporizing the ethylene cyanohydrin and passing it at about its boiling point upwards through a vertical column of a dehydrating catalyst consisting of activated alumina, condensing any unchanged ethylene cyanohydrin at a temperature above the boiling point of acrylonitrile in a zone above the catalyst, flowing the condensate downwards over the catalyst, passing the vapors of the arcylonitrile and water formed by the reaction to a condenser, separating the condensed acrylonitrile from the water, and returning part of it to the top of the fractionating zone.

LE ROY U. SPENCE.
JOHN C. MITCHELL.